United States Patent [19]
Tojo et al.

[11] Patent Number: 5,404,410
[45] Date of Patent: Apr. 4, 1995

[54] METHOD AND SYSTEM FOR GENERATING A BIT PATTERN

[75] Inventors: Toru Tojo, Kanagawa; Hideo Tsuchiya, Kawasaki; Kyoji Yamashita; Mitsuo Tabata, both of Yokohama; Ryoichi Yoshikawa, Kawasaki, all of Japan

[73] Assignee: Kabushiki Kaisha Toshiba, Kawasaki, Japan

[21] Appl. No.: 180,813

[22] Filed: Jan. 10, 1994

Related U.S. Application Data

[60] Division of Ser. No. 99,409, Jul. 30, 1993, abandoned, which is a continuation of Ser. No. 709,020, May 31, 1991, abandoned.

[30] Foreign Application Priority Data

May 31, 1990 [JP] Japan ................... 2-139993

[51] Int. Cl.$^6$ ............................................. G06K 9/38
[52] U.S. Cl. ........................................... 382/50; 382/8
[58] Field of Search ................... 382/8, 47, 50–54; 358/459, 466; G06K 9/38, 9/40, 9/42; H04N 1/04, 1/40

[56] References Cited

U.S. PATENT DOCUMENTS

| | | | |
|---|---|---|---|
| 4,381,547 | 4/1983 | Ejiri | 382/47 |
| 4,633,503 | 12/1986 | Hinman | 382/47 |
| 4,809,341 | 2/1989 | Matsui et al. | 382/47 |
| 4,942,619 | 7/1990 | Takagi et al. | 382/47 |
| 5,097,518 | 3/1992 | Scott et al. | 382/47 |
| 5,113,455 | 5/1992 | Scott | 382/47 |
| 5,301,248 | 4/1994 | Takanori et al. | 382/47 |

OTHER PUBLICATIONS

Ryoichi Yoshikawa, et al. "Automated Reticle Pattern Inspection Systems for VLSI", Spring 1984, pp. 44–48.

*Primary Examiner*—Jose L. Couso
*Attorney, Agent, or Firm*—Oblon, Spivak, McClelland, Maier & Neustadt

[57] ABSTRACT

A pattern defect inspection apparatus according to this invention comprises an irradiation circuit for irradiating a substrate on which a given pattern is drawn, a detector circuit for detecting said irradiated pattern on said substrate, a bit pattern generating circuit for quantizing and generating previously given design data by processing said design data based on specified figure information to obtain bit pattern data composed of a finite number of pixels, and a comparator circuit for detecting defects on said substrate by comparing the detected data from said detecting means with the data from said bit pattern generating means, wherein the bit pattern generating circuit has an additional parameter conditioner for setting the dimension of each pixel to be quantized into said bit pattern data to the desired value.

5 Claims, 17 Drawing Sheets

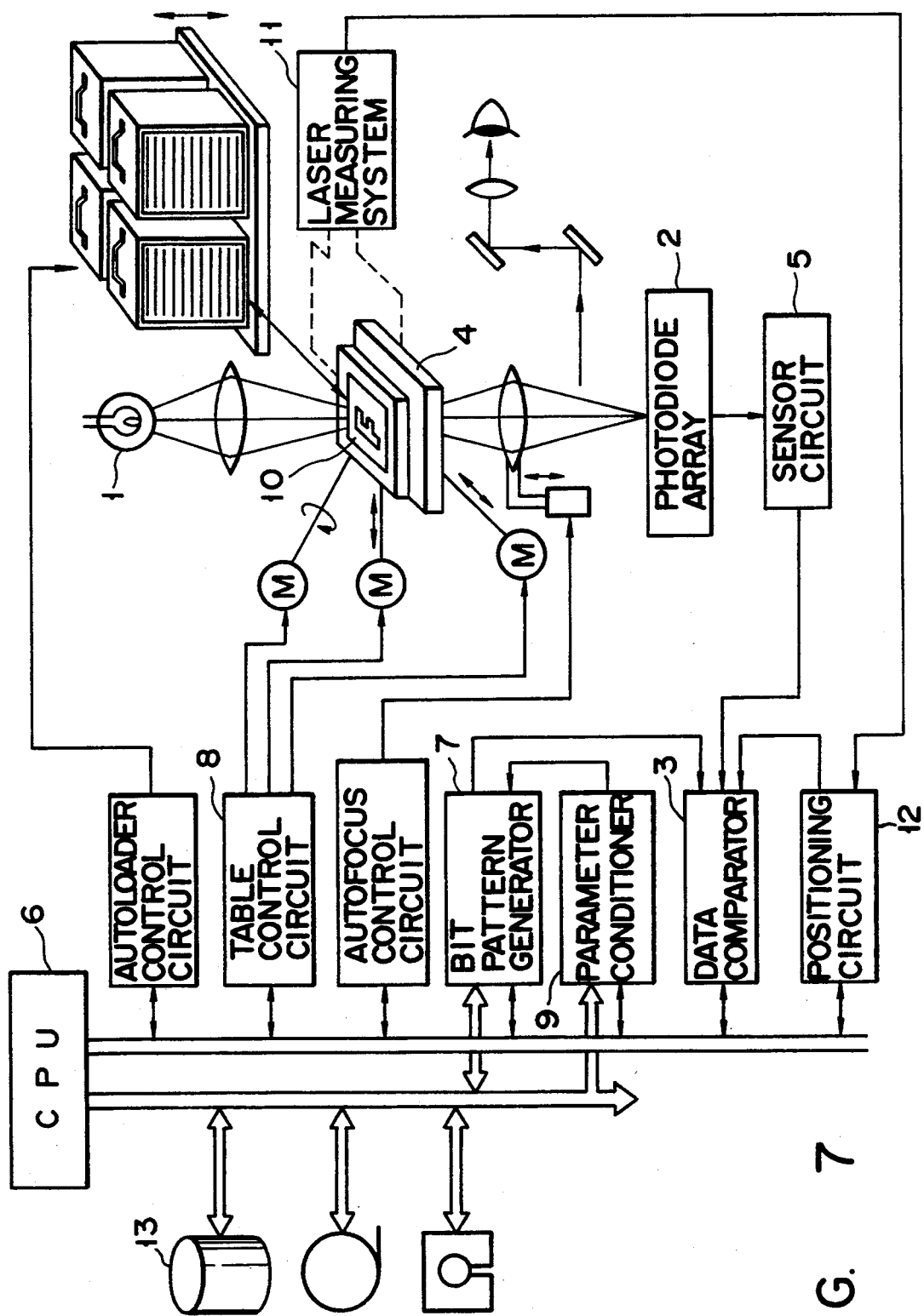
F I G. 7

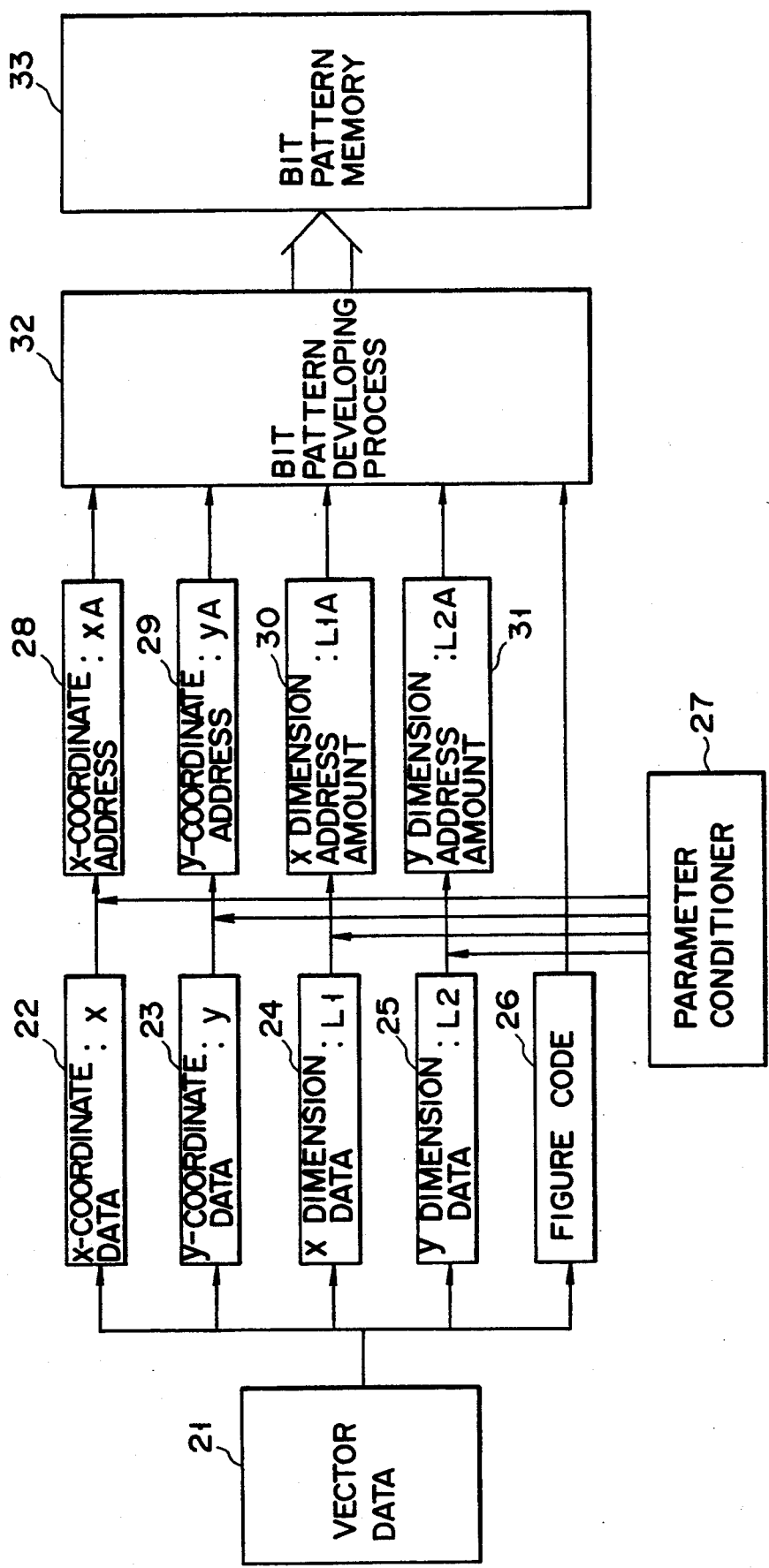
F I G. 11

| | | |
|---|---|---|
| α | FIGURE CODE : | POSITIVE SLOPE TRIANGLE |
| | COORDINATES : | X1 |
| | : | y |
| | SIDE LENGTH : | L1 |
| | : | L2 |
| β | FIGURE CODE : | RECTANGLE |
| | COORDINATES : | X2 |
| | : | y |
| | SIDE LENGTH : | L3 |
| | : | L2 |
| γ | FIGURE CODE : | NEGATIVE SLOPE TRIANGLE |
| | COORDINATES : | X3 |
| | : | y |
| | SIDE LENGTH : | L4 |
| | : | L2 |

FIG. 13

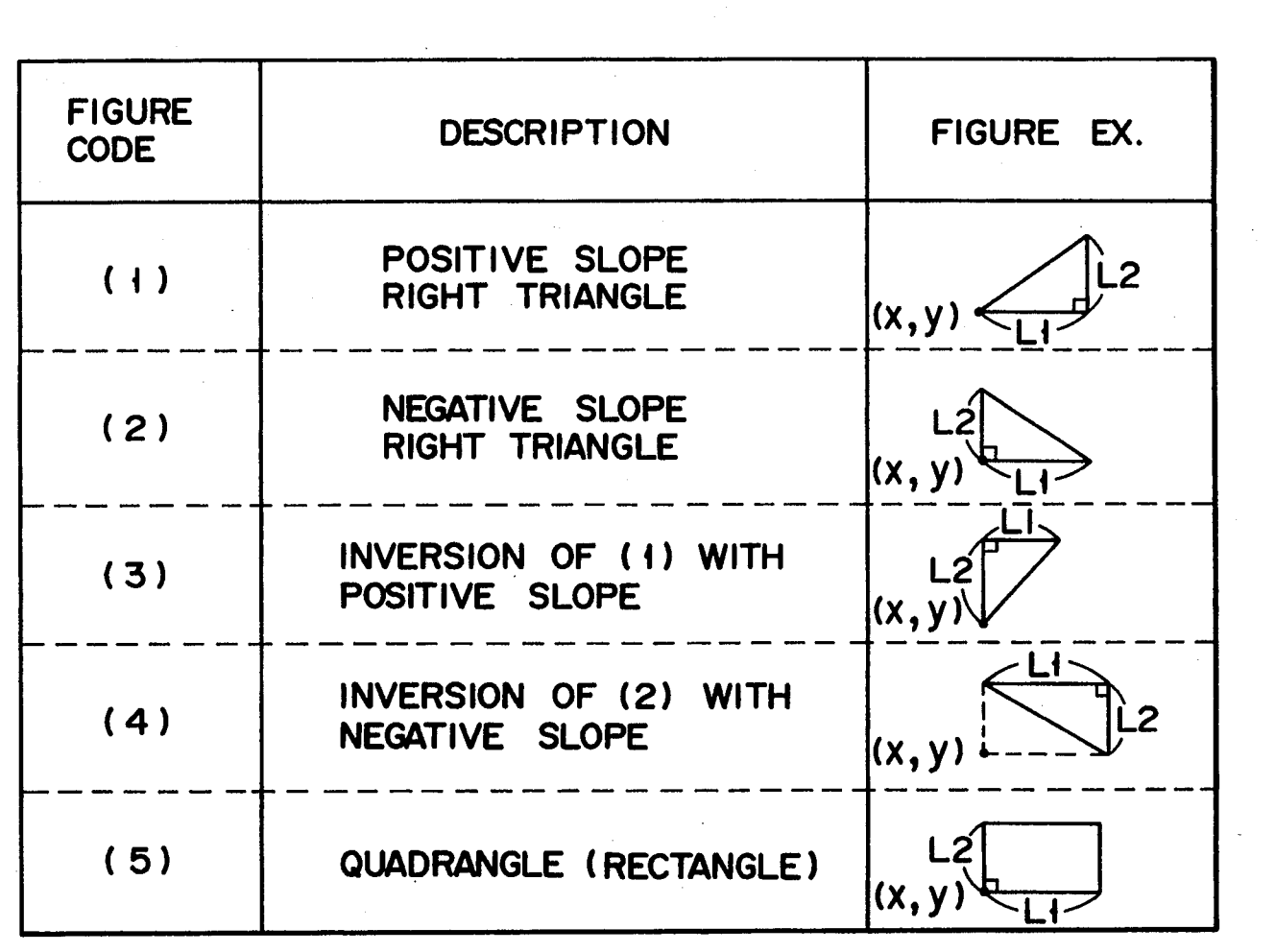

| FIGURE CODE | DESCRIPTION | FIGURE EX. |
|---|---|---|
| (1) | POSITIVE SLOPE RIGHT TRIANGLE | |
| (2) | NEGATIVE SLOPE RIGHT TRIANGLE | |
| (3) | INVERSION OF (1) WITH POSITIVE SLOPE | |
| (4) | INVERSION OF (2) WITH NEGATIVE SLOPE | |
| (5) | QUADRANGLE (RECTANGLE) | |

FIG. 14

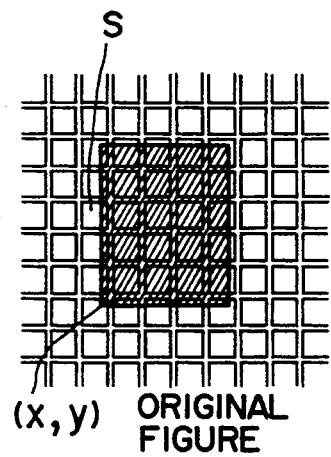
(x,y) ORIGINAL FIGURE
F I G. 17A
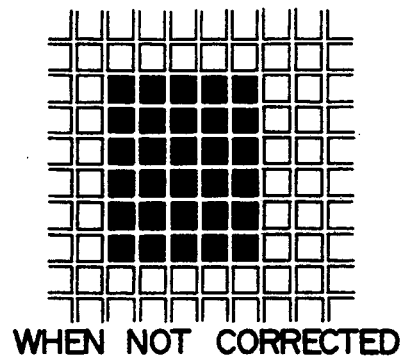
WHEN NOT CORRECTED
F I G. 17B
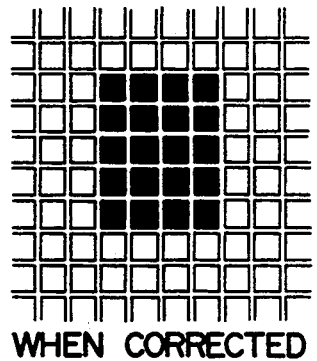
WHEN CORRECTED
F I G. 17C
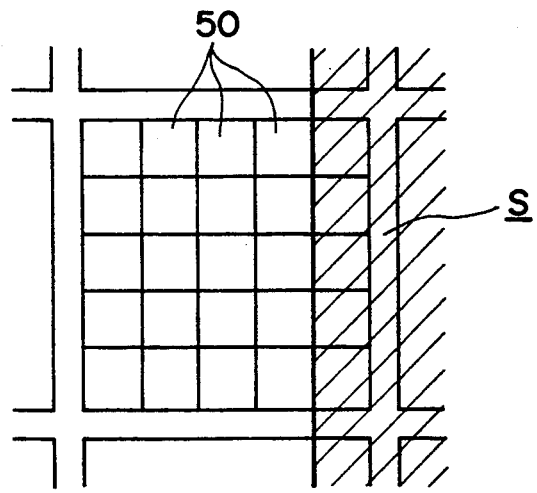
F I G. 18

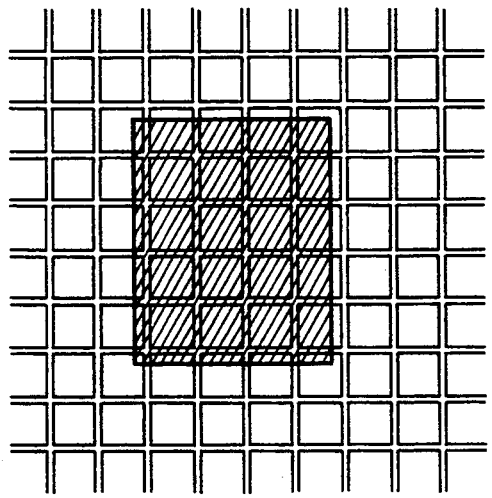
ORIGINAL FIGURE
F I G. 20A
BIT PATTERN DATA WITH CORRECTION INFORMATION
F I G. 20B
|  | | OLD DATA | | |
|---|---|---|---|---|
|  |  | 0 | 1 | 2 |
| NEW DATA | 0 | 0 | 1 | 2 |
|  | 1 | 1 | 1 | 1 |
|  | 2 | 2 | 1 | 1* |
|  |  |  |  |  |
*: INFORMATION TO BE DISCARDED HAS BEEN REMOVED
F I G. 21

METHOD AND SYSTEM FOR GENERATING A BIT PATTERN

This application is a division of application Ser. No. 08/099,409, filed on Jul. 30, 1993, now abandoned, which is a continuation of application Ser. No. 07/709,020, filed on May 31, 1991, now abandoned.

BACKGROUND OF THE INVENTION

1. Field of the Invention

This invention relates to a method and system for generating pattern information on a specific figure into a bit pattern, and further relates to a pattern defect inspection method and system employing the preceding method and system for inspecting photomasks or reticles for pattern defects such as pattern disconnections in the manufacture of semiconductor integrated circuit elements.

2. Description of the Related Art

In the manufacture of semiconductor integrated circuit elements, pattern defects such as pattern disconnections in the photomask used for pattern transfer produce no desired elements, resulting in a reduction in the fabrication yield.

Conventionally, photomasks produced by an electron beam exposure system have been inspected with a mask defect inspection system. As shown in FIG. 1, with the inspection apparatus, rays of light generated at a lamp 101 are illuminated onto a photomask 110. A photodiode array 102 then detects an optical signal corresponding to the pattern formed on the mask 110. A data comparator circuit 103 compares and collates a reference signal based on the design data on the formation of the design pattern on the mask 110 with the optical signal detected at the photodiode array 102. Based on the results, it is possible to decide whether of not pattern defects exist on the mask 110 and make a yes-no decision about the pattern being inspected.

The operation of such a mask defect inspection apparatus will now be described.

The apparatus generally performs unit frame inspection, in which a pattern is inspected by moving the table 104 continuously in the X or Y direction each time the table 104 moves by the frame width in the direction perpendicular to that of the continuous movement. The unit frame inspection covers the entire pattern-forming surface area on the photomask 110.

The photodiode array 102 and a sensor circuit 105 detects an optical signal corresponding to the actual pattern on the photomask 110, and then supplies it to the data comparator circuit 103. At the same time, a bit pattern generator 107 reads from a computer 106 design data used to form a design pattern on the photomask 110, and based on the signal from a bit pattern generator 107, produces a reference signal. It then compares and collates the optical signal and the reference signal for each measuring position on the table 104. The comparing and collating processes are performed with the table 104 in continuous motion at a constant speed.

Here is a concrete example of a defect judging method, which has been employed by the above-mentioned mask defect inspection apparatus to judge whether or not defects exist by comparing the optical signal based on actual pattern detection with the reference signal based on the design pattern.

Using information $P(x, y)$ on the design pattern (letter F, in this case) as shown in (A) of FIG. 2 and the sensitivity characteristics $F(x, y)$ for the photodiode 102 as shown in (B) of FIG. 2, the predicted sensor output (optical signal) R, as shown in (C) of FIG. 2, for the image-forming system is calculated. The data comparator circuit 103 then compares the actual output S of the sensor 105 as in (D) of FIG. 2 (here, the output at the position $3 \times 3$ in the top right corner reads a small value "3") with the predicted sensor output R of (C) of FIG. 2, and when the resulting difference is larger than a preset signal level, judges that there is a defect at the position corresponding to the judged data. For FIGS. 2(A) through (D) the output difference between the defective portion and the design data is 2 (=5−3). In this case, a signal level difference equal to or more than 1 is previously defined as defective. Consequently, the output difference of 2 is judged to be defective.

In such a comparing method, however, the area dimension for a piece of data on the predicted sensor output R (bit dimension in the design data) fails to agree completely with a single area dimension for the actual sensor output S (a single pixel dimension in the actual measurement data). Specifically, when the area dimension for the actual sensor output S is 0.6 [μm], the corresponding area dimension for the design data is 0.5 [μm]. Here, an area dimension is defined as an area (size) specified by a piece of data.

The cause of the bit dimension in the design data disagreeing with a single pixel dimension in the actually measured data will now be discussed. Of several known causes, two typical ones will be taken up here. Referring to FIG. 3, the first cause will be explained. Since a figure (a pattern) is defined in dots based on the patterning data supplied from the electron beam patterning apparatus instead of being defined in actual dimensions, the bit dimension in the design data fails to coincide completely with a single pixel dimension from the sensor. For instance, as shown in FIG. 3, to obtain an actual pattern with a 256 [μm] width (a256 [μm] deflecting width), it is necessary to draw a single bit using a beam with a1 [μm/spot] size obtaining an actual pattern with a128 [μm] width (a128 [μm] deflecting width) requires a0.5 [μm/spot] size beam per bit; and achieving an actual pattern with a64 [μm] (a64 [μm] deflecting width) width needs a0.25 [μm/spot] size beam per bit. The reason why the patterning beam spot size can be set to only discrete values is that the beam spot size depends on the deflection width in the electron beam exposure apparatus. That is, changing the deflection width of the exposure apparatus according to each of the patterning areas 256 [μm], 128 [μm], and 64 [μm], allows the patterning beam width to assume values stepwise. Thus, it is impossible that the bit dimension in the design data agrees completely with a single pixel dimension from the sensor. It is apparent that the limited setting of the patterning beam width to specified values prevents the dimension R (the predicted sensor output) based on the design data from perfectly coinciding with the actual pixel dimension (the sensor output).

The mask is drawn by a technique known as scaling. In this technique, the dimensions obtained from the design data is varied by multiplying them by a scaling factor that assumes different values. The change of dimension can be achieved by narrowing or broadening the deflecting width and the beam spot size. A different pattern is drawn based on the same data by varying the deflection width of the electron beam according to the scaling. In the scaling technique, the beam width per actual bit is varied by multiplying the dimension obtained from the design data by one of different magnifications available. A similar problem arises that the dimension per dot and the sensor pixel dimension do not coincide, preventing improvements in the defect detecting level.

The second cause of the bit dimension in the design data disagreeing with a single pixel dimension in the sensor will now be explained. In an ordinary inspection apparatus, inspection is often carried out with two modes of measurement accuracy: rough mode and precision mode. Usually, the mode remains unchanged for the same substrate. The change of measurement accuracy is achieved by changing optical characteristics. A concrete example of changing optical characteristics is the change of magnification of an object lens. Because of the difficulty in changing a magnification in steps of an integral multiple, the magnification is an integral multiple containing errors. The errors in the magnification cause the sensor pixel dimension to make optical minute fluctuations, resulting in a disagreement problem between the bit dimension in the design data and a single pixel dimension in the sensor.

When a bit dimension in the design data disagrees with a single pixel dimension in the sensor as mentioned above, the process shown in FIG. 4 is done in practice. Here, the comparison data (R) is formed by curtailing the design data. Defects are detected by comparing the comparison data (R) with the actual measurement data (S). This comparing process includes processes shown in FIGS. 2A through 2D. To be exact, however, there are some local positional differences between the design data and the actual measurement data. Thus, the comparison inspection is performed in the situation involving such differences. For instance, if the actual measurement data is given in units of 0.6 [μm] and the design data in units of 0.5 [μm], comparison is carried out at the correct positions at regular intervals of 3 [μm] that is the least common multiple of 0.6 [μm] and 0.5 [μm]. At other positions, however, positional differences of up to −0.3 [μm] appear. For instance, when m=3 and n=3, the following equation is given:

$$0.5 \times m - 0.6 \times n = -0.3$$

To minimize such a positional difference, after a piece of data for m=4 is discarded, data for m=5 and n=4 are compared. However, the positional difference thus minimized varies with the scaling factor in the electron beam patterning apparatus.

With the presence of positional differences, comparison of the predicted sensor output (design data) R calculated with the sensor output (actual measurement data) causes many spurious defects to be detected. Detection of such spurious defects makes impossible highly accurate detection of real defects.

More detailed descriptions will be given for the case of curtailing data as described above, referring to FIG. 5, and for the case of performing the process opposite to the data curtailment, referring to FIG. 6. In the data curtailment of FIG. 5, although the sensor output has a defect at a specific position, the defect cannot be detected because the design data happens to have the corresponding data curtailed. Contrarily, in FIG. 6, a specific position (bit) in the design data is referred to repeatedly instead of curtailing data from the design data. In both cases, despite the absence of defects in the sensor output, a specific position (bit) in the sensor output has no corresponding position in the design data being compared, leading to the judgment that there is a defect at the position.

The spurious defect problem in the inspection process of semiconductor elements is related to a problem with the manufacturing process of semiconductor elements. Thus, the disagreement of actual measurement data with design data can be discussed in the same manner as the disagreement of design data with actual measurement data. Consequently, improving the bit pattern generation technique used in the manufacturing processes of semiconductor elements leads to improvements in the pattern defect inspection technique used in the inspection process of semiconductor elements. The reverse is also true. That is, the minimization of spurious defects for higher inspection accuracy is achieved directly by improving the pattern defect inspection technique and indirectly by improving the bit pattern generatement technique.

SUMMARY OF THE INVENTION

Accordingly, an object of the present invention is to provide a method and system for generating a bit pattern that indirectly minimizes the detection of spurious defects and improves the inspection accuracy.

Another object of the present invention is to provide a method and system for generating a bit pattern that directly minimizes the detection of spurious defects and improves the inspection accuracy.

The foregoing objects are accomplished by a method for generating a bit pattern, comprising the steps of: quantizing at least a given figure so that the given figure may be generated into a bit pattern composed of a finite number of pixels on the basis of specified figure information; and generating the quantized given figure; wherein the quantizing step includes the step of setting the dimension of each pixel to the desired value.

The foregoing objects are also accomplished by a method for generating a bit pattern, comprising the steps of: quantizing at least a given figure so that the given figure may be generated into a bit pattern composed of a finite number of pixels on the basis of specified figure information; and generating the quantized given figure; wherein the quantizing step includes the step of processing fractional pixels less than one pixel generated in obtaining the quantized bit pattern data by using a specified calculation technique, and based on the results, allocating bit pattern data.

The aforementioned objects are accomplished by a system for generating a bit pattern, comprising: quantizing means for quantizing at least a given figure so that the given figure may be generated into a bit pattern composed of a finite number of pixels on the basis of specified figure information; and generating means for generating the quantized given figure; wherein the quantizing means includes means for setting the dimension of each pixel to the desired value.

The aforementioned objects are accomplished by a system for generating a bit pattern, comprising: quantizing means for quantizing at least a given figure so that the given figure may be generated into a bit pattern composed of a finite number of pixels on the basis of specified figure information; and generating means for generating the quantized given figure; wherein the quantizing means includes means for processing fractional pixels less than one pixel generated in obtaining the quantized bit pattern data by using a specified calculation technique, and based on the results, allocating bit pattern data.

The aforementioned objects are accomplished by a method for pattern defect inspection, comprising the steps of: irradiating a substrate on which a given pattern is drawn; detecting the irradiated pattern on the substrate; inspecting the pattern on the substrate for defects by comparing the detected data from the detecting means with the bit pattern data generated, based on specified figure information, from the previously given design data to form the pattern; wherein the bit pattern data is created by the abovementioned method.

The aforementioned objects are accomplished by a method for pattern defect inspection, comprising the steps of: irradiating a substrate on which a given pattern is drawn; detecting the irradiated pattern on the substrate; inspecting the pattern on the substrate for defects by comparing the detected data from the detecting means with the bit pattern data used to form the pattern by processing previously given design data based on specified figure information; wherein the bit pattern data is created by the abovementioned method.

The foregoing objects are accomplished by a pattern defect inspection apparatus, comprising: irradiating means for irradiating a substrate on which a given pattern is drawn; detecting means for detecting the irradiated pattern on the substrate; bit pattern developing means for quantizing and generating previously given design data by processing the design data based on specified figure information to obtain bit pattern data composed of a finite number of pixels; and comparing means for detecting defects on the substrate by comparing the detected data from the detecting means with the data from the bit pattern generating means; wherein the bit pattern generating means includes a parameter conditioner for setting the dimension of each pixel to be quantized into the bit pattern data to the desired value.

The foregoing objects are accomplished by a pattern defect inspection apparatus, comprising: irradiating means for irradiating a substrate on which a given pattern is drawn; detecting means for detecting the irradiated pattern on the substrate; bit pattern developing means for quantizing and generating previously given design data by processing the design data based on specified figure information to obtain bit pattern data composed of a finite number of pixels; and comparing means for detecting defects on the substrate by comparing the detected data from the detecting means with the data from the bit pattern generating means; wherein the bit pattern generating means includes means for processing fractional pixels less than one pixel generated in obtaining the quantized bit pattern data by using a specified calculation technique, and based on the results, allocating bit pattern data.

The foregoing objects are accomplished by a method for pattern defect inspection, comprising the steps of: irradiating a substrate on which a given pattern is draw; detecting said irradiated pattern on said substrate; inspecting said pattern on said substrate for defects by comparing the detected data from said detecting means with the bit pattern data used to form said pattern by processing previously give design data based on specified figure information; wherein said method comprising step for inspecting a single substrate while changing the inspection accuracy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a block diagram for a pattern defect inspection apparatus according to an embodiment of the present invention;

FIG. 11 is a block diagram for a first embodiment of a data generating circuit for generating a bit pattern according to the present invention;

FIGS. 13 and 14 are explanatory diagrams of the recording format for basic figures in connection with the present invention;

FIGS. 17A through 17C and FIG. 18 are explanatory diagrams for a fractional bit less than a pixel in conjunction with the present invention;

FIGS. 20A and 20B and 21 are explanatory diagrams of the processing method for the outline portions of the figure in conjunction with the present invention.

DETAILED DESCRIPTION OF THE PREFERRED EMBODIMENTS

A pattern defect inspection apparatus according to an embodiment of the present invention will be explained, referring to the accompanying drawings.

FIG. 7 shows the entire schematic diagram for a pattern defect inspection apparatus according to the present invention. The most different feature from a conventional pattern defect inspection apparatus is the addition of a parameter conditioner 9, which will be explained later.

Before entering the explanation of the parameter conditioner 9 characteristic of the present invention, the entire apparatus will be described.

Figure 1:
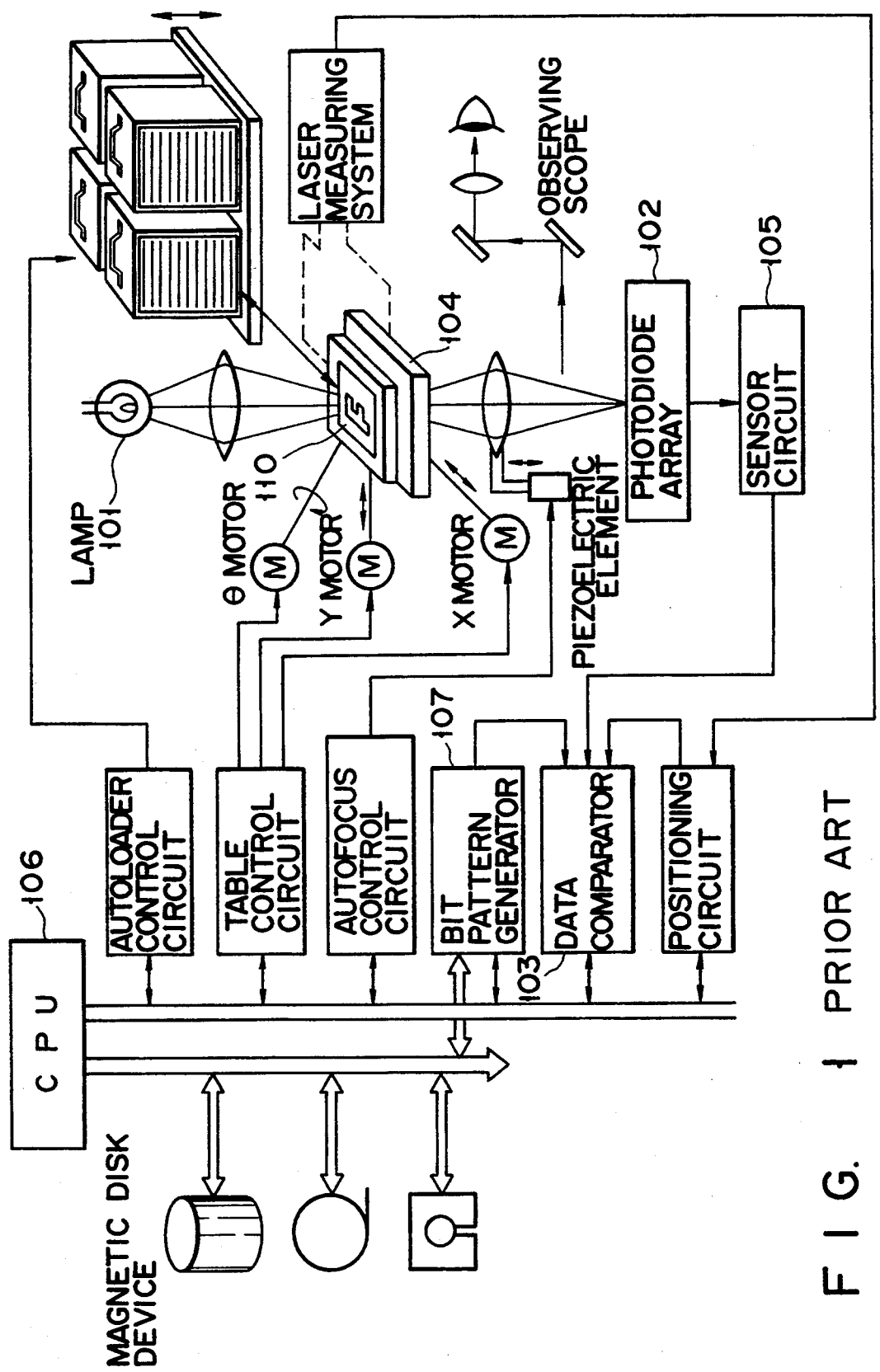
FIG. 1 is a block diagram for a conventional pattern defect inspection apparatus.
Figure 2:
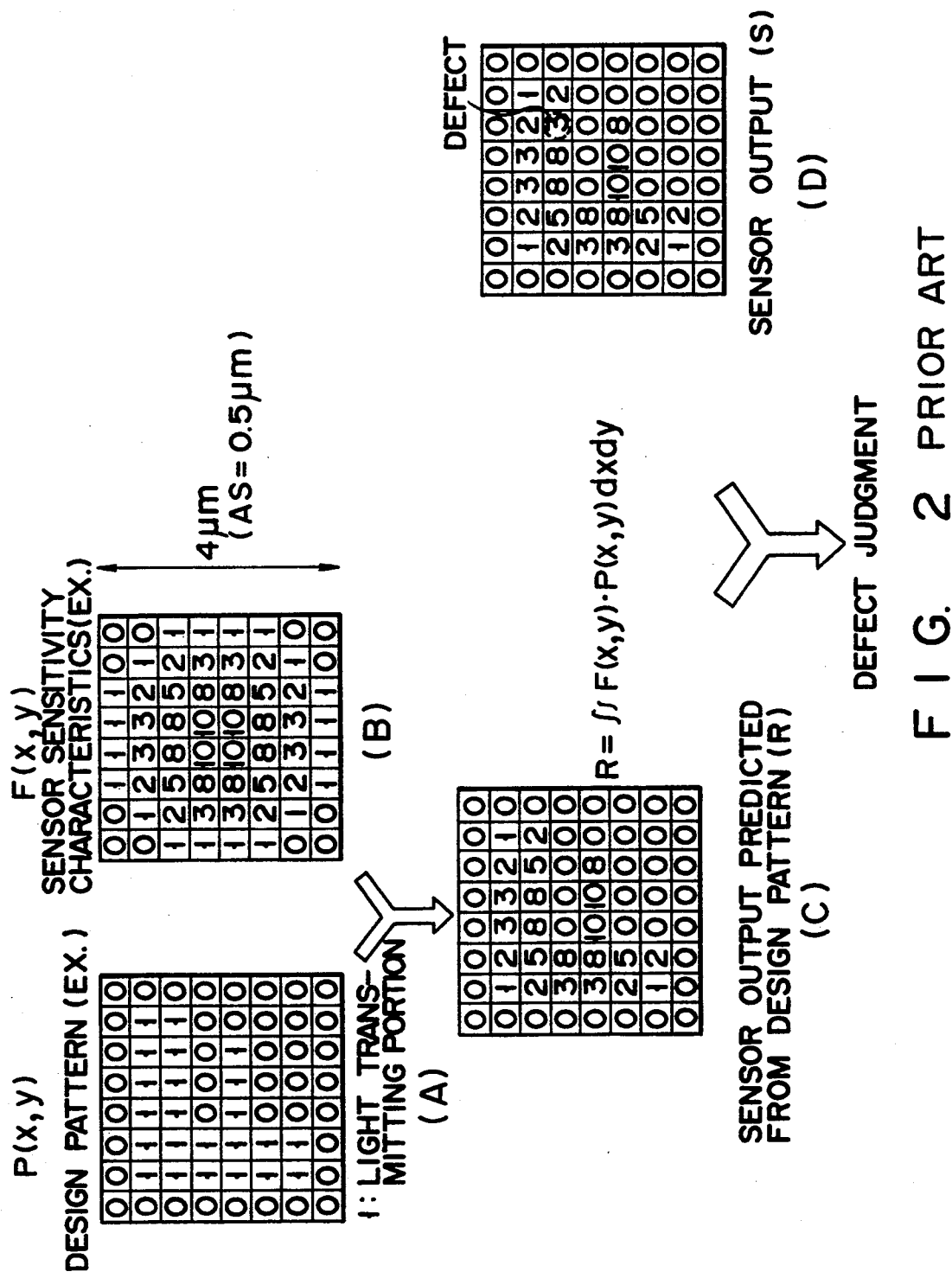
FIG. 2 is a principle diagram for explaining the way of comparison.
Figure 3:
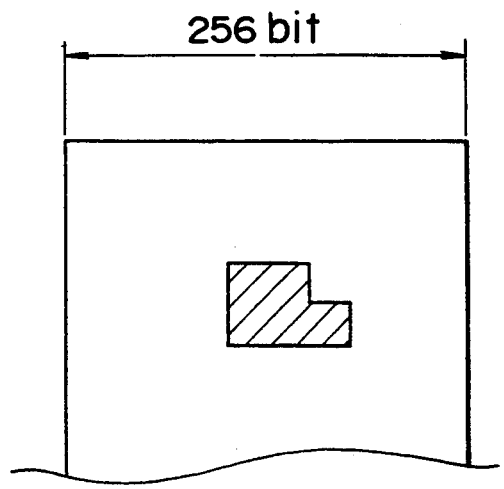
FIG. 3 is an explanatory diagram for bit generatement.
Figure 4:
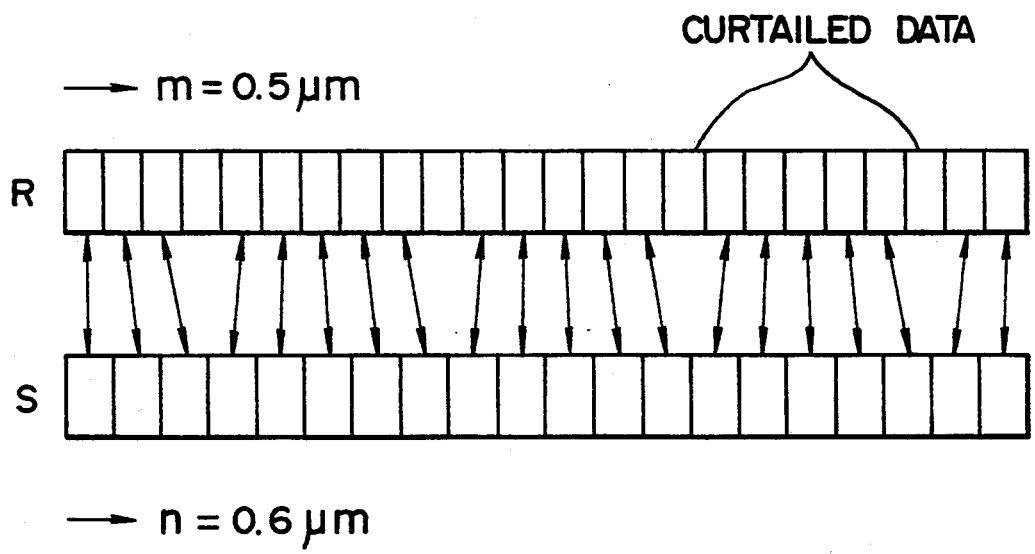
FIG. 4 is an explanatory diagram for the generation of a spurious defect due to curtailment.
Figure 6:
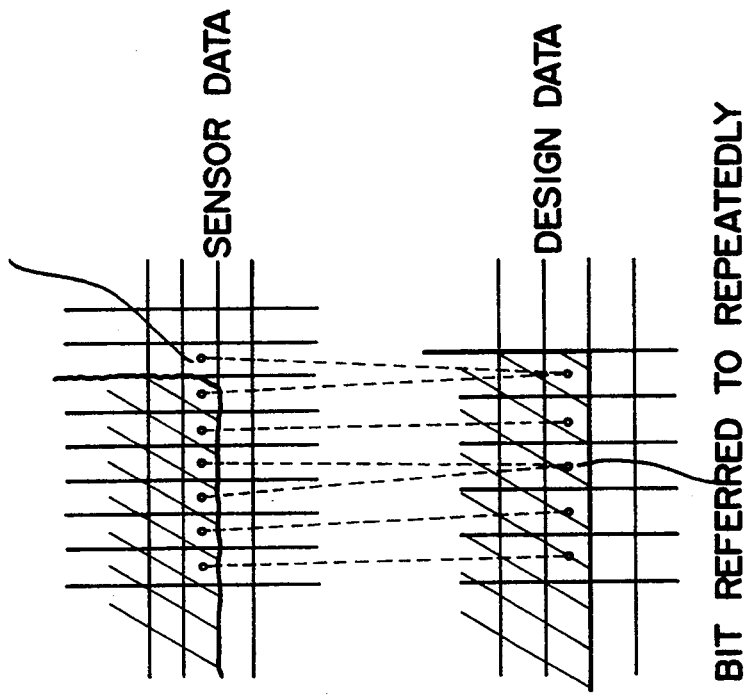
FIG. 6 is an explanatory diagram for a concrete example of a spurious defect occurring due to the opposite process to curtailment.
Figure 5:
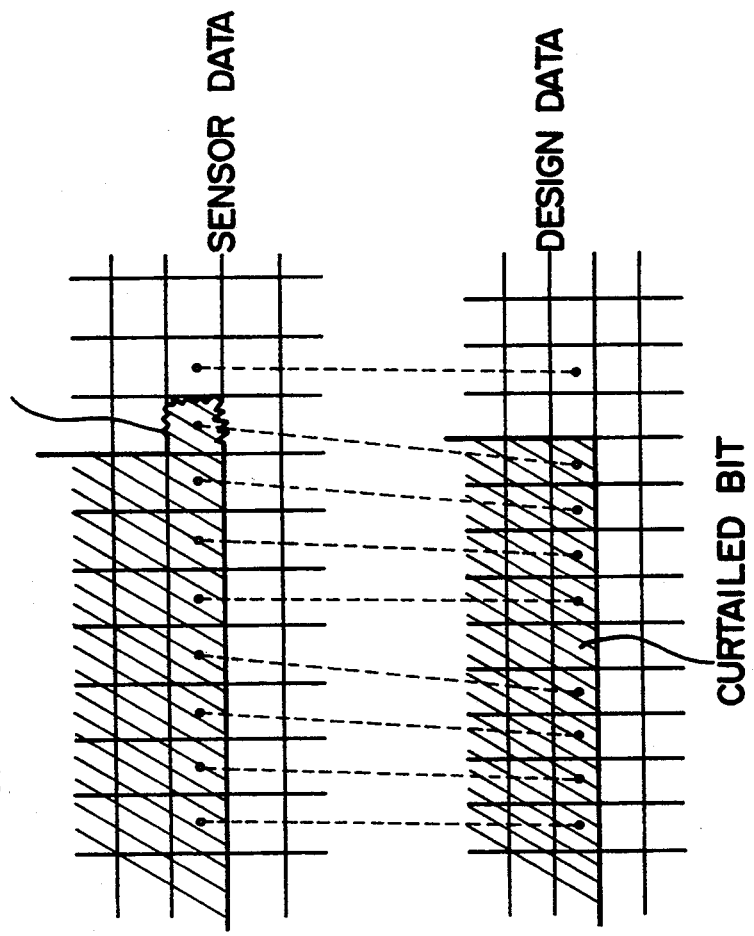
FIG. 5 is an explanatory diagram for a concrete example of a spurious defect occurring due to curtailment.

In FIG. 7, a photomask 10 is placed on a specimen carrier 4, which is moved in the X and Y directions by a table control circuit 8 receiving the instruction from a computer 6. The coordinates of the specimen carrier 4 are measured with a positioning circuit 12 composed of a laser interferometer 11, for example. Located above the specimen carrier 4 is a light source 1 as a radiation section, which sheds rays of light on the photomask 10. The transmitted light is introduced to the light receiving surface of the photodiode array 2 as a signal detector section. The photodiode array 2 consists of a plurality of photosensors arranged in one direction as shown in FIG. 4 at reference character S. Thus, by moving the specimen carrier 4 continuously, the photodiode array 2 detects an inspection signal (measurement signal) corresponding to the inspected pattern on the photomask 10. This measurement signal, which is expressed as F(x,y) in two dimensions as shown in FIG. 2B, is sent to a data comparator circuit 3.

The design pattern data transferred from a magnetic disk device 13 undergoes various processes at the computer 6. The processed design pattern data is transferred from the computer 6 to a bit pattern generator circuit 7, in which the design pattern is expressed as P(x,y) by 1s and 0s as shown in FIG. 2A by dividing the design pattern data into pieces of data with suitable dimensions. Conventionally, various problems arose because the dividing ratio was fixed. The data created at bit pattern generator circuit 7 is sent to the data comparator circuit 9, which performs the process shown in FIG. 17 to determine whether or not defects exist.

Figure 8:
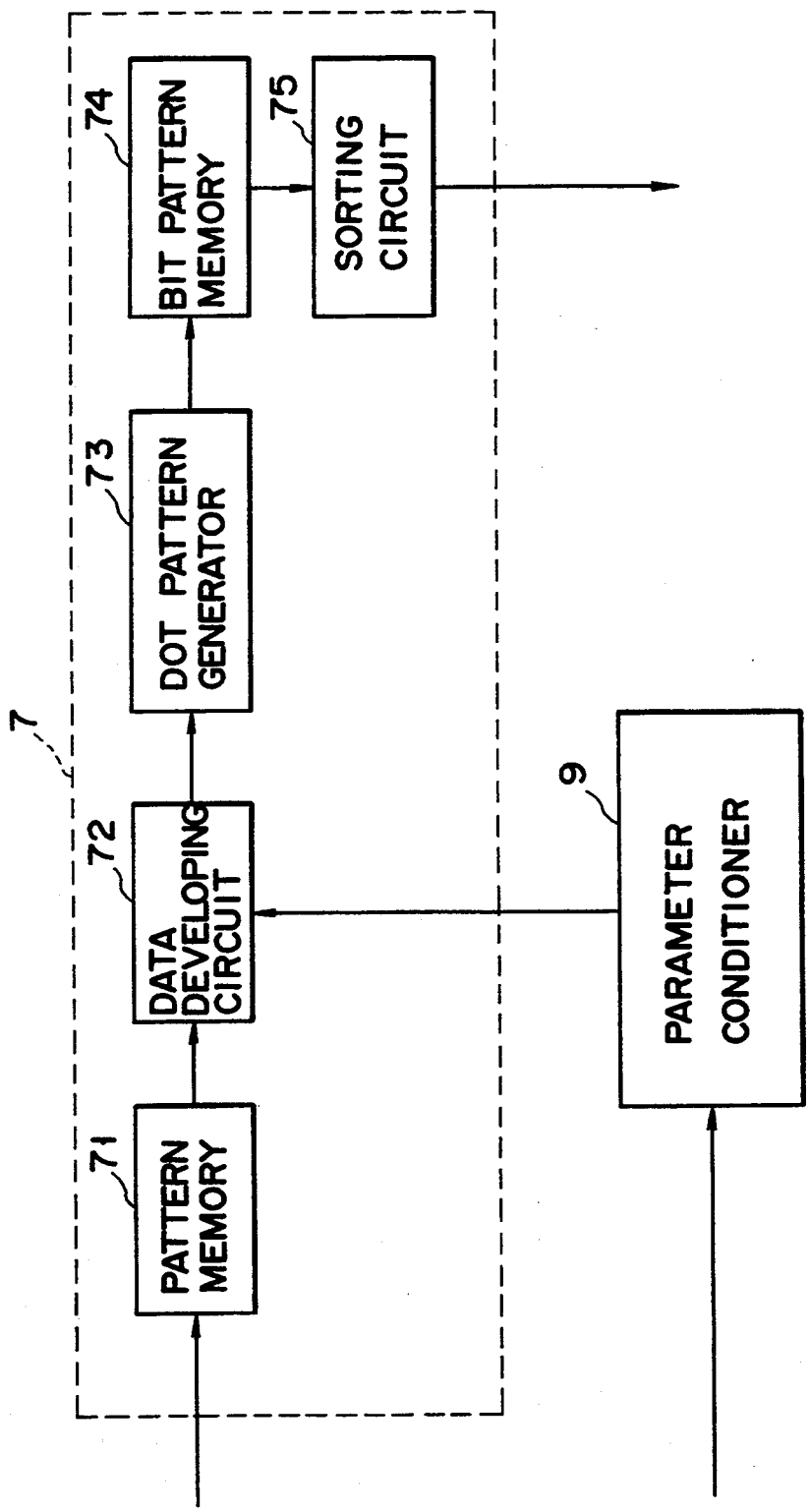
FIG. 8 is a block diagram for an embodiment of the bit pattern generator circuit in FIG. 7.
Figure 10:
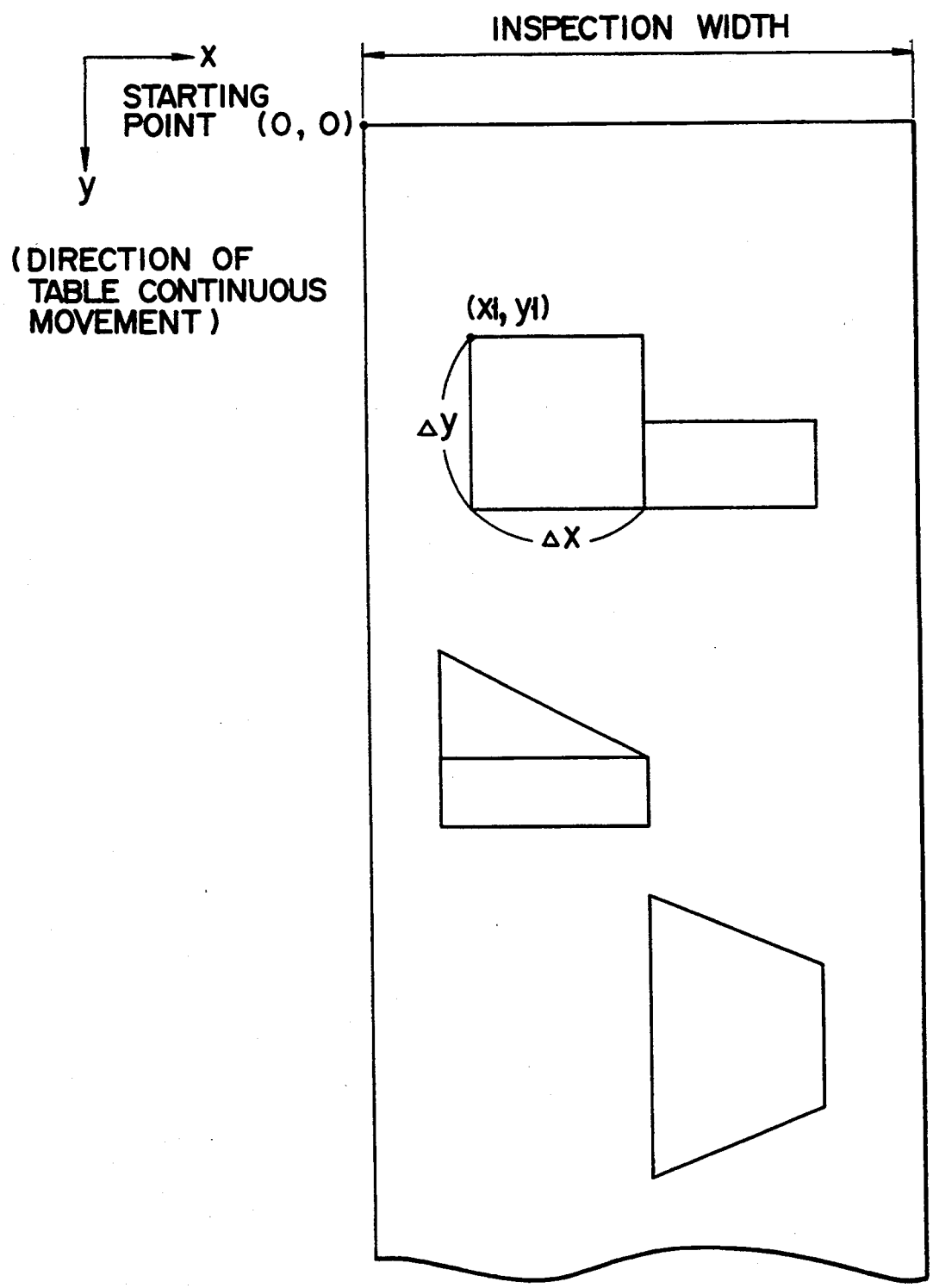
FIG. 10 is an explanatory diagram for the operation of the bit pattern generator circuit according to the present invention.
Figure 16:
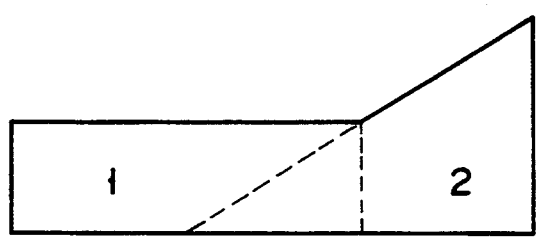
FIG. 16 is an explanatory diagram for the overlap of figures in connection with the present invention.
Figure 16:
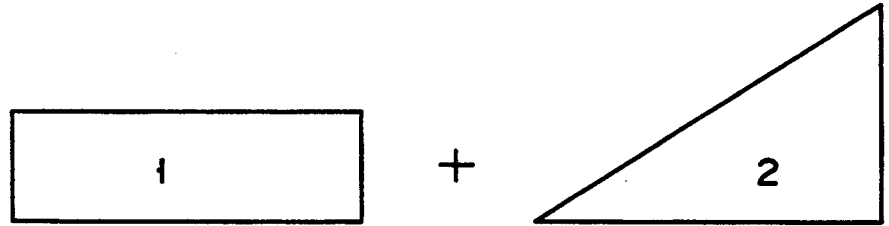

As shown in FIG. 8, the necessary part for inspection of the pattern data converted at the computer 6 is stored in the pattern memory 71 in the bit pattern generator circuit 7. In this case, the symbolized data in the design pattern data is generated as basic data at the subsequent data generating circuit 72. That is, as shown in FIG. 10, the symbolized data is generated into basic figure data including a quadrangle, a triangle, and a trapezoid. The generated data is sent to the dot pattern generator 73, which expresses a figure corresponding to that in FIG. 16 as a bit pattern of 1s and 0s based on the generated data it received. The specific figure is now defined as a bit pattern. The data fixed as a bit pattern is then stored temporarily in the bit pattern memory 74, the output of which is supplied via the sorting circuit 75 so that the bit pattern generator circuit 7 may supply the output compatible to the input and output of the data comparator circuit 3.

The parameter conditioner 9 receives the inspection magnification ΔB, the magnification difference ΔB between the design data and the figure on the actual photomask 10, and the scaling factor K, etc, from the computer 6, and based on these parameters, changes the magnification in generating the design data into the figure data at the data generating circuit 72. The change of the magnification causes the bit dimension of the bit pattern data based on the design data to be equal to the single pixel dimension of the sensor by multiplying the bit dimensions by one or by (1/an integer). The magnification changing is performed automatically on the basis of the above parameters $\beta$, $\Delta\beta$, and K.

The operation of the data generating circuit 72 controlled on the basis of the above parameters will be explained. For example, if the bit pattern data (the design pattern) based on the design data is a quadrangle shown in FIG. 10, or the figure (quadrangle) defined by the information of the coordinates $(x_1, y_1)$ with respect to the origin and the lengths $\Delta x$ and $\Delta y$, the following expression holds for the dimension corresponding to the sensor pixel f (p):

$$f(p) \times n > x_1$$

where n is an integer indicating the number of the pixel, n is counted up to represent the number of pixels. Fractions, if any, are rounded off in a suitable manner such as rounding up numbers of five and above and rounding down anything under five.

Similarly, m is given by the following expression:

$$f(p) \times m > y_1$$

where at the position m=m in the y direction, n in a range of 1 to $n_1$ in the x direction is defined as 0. Then, $n_1$ is given by the following expression:

$$f(p) \times n_1 > x_1 + \Delta x$$

where at the position m=m in the y direction, n in a range of n to $n_1$ in the x direction is defined as 1, whereas n in the subsequent range is defined as 0. With this definition, at the position m=m in the y direction, the figure (quadrangle) is defined with the 10 dimensions corresponding to the sensor pixel. Following the similar procedures at m=m+1 in the y direction produces the dot data for defining the figure equal to the sensor pixel. It is important to make f (p) equal to the sensor pixel. For example, if f (p) is changeable with the inspection magnification ($\beta$), the magnification difference ($\Delta\beta$) between the design data and the actual data, and the scaling factor (K), then f (p) will be expressed as:

$$f(p) = f(\beta, \Delta\beta, K)$$

That is, f (p) is a function of $\beta$, $\Delta\beta$, and K. This value must be calculated in a way peculiar to each apparatus. In this way, bit data coinciding with the actual pixel dimension can be created by defining actual coordinate dimensions and obtaining pixel dimension changeable depending on various conditions.

While in the above embodiment, a function of $\beta$, $\Delta\beta$, and K is used as f(p), the following functions $f_1(p)$, $f_2(p)$, $f_3(p)$, $f_4(p)$, $f_5(p)$, and $f_6(p)$ may be used:

$$f_1(p) = f(\beta, \Delta\beta)$$

$$f_2(p) = f(\beta, K)$$

$$f_3(p) = f(\Delta\beta, K)$$

$$f_4(p) = f(\beta)$$

$$f_5(p) = f(\Delta\beta)$$

$$f_6(p) = f(K)$$

Figure 9:
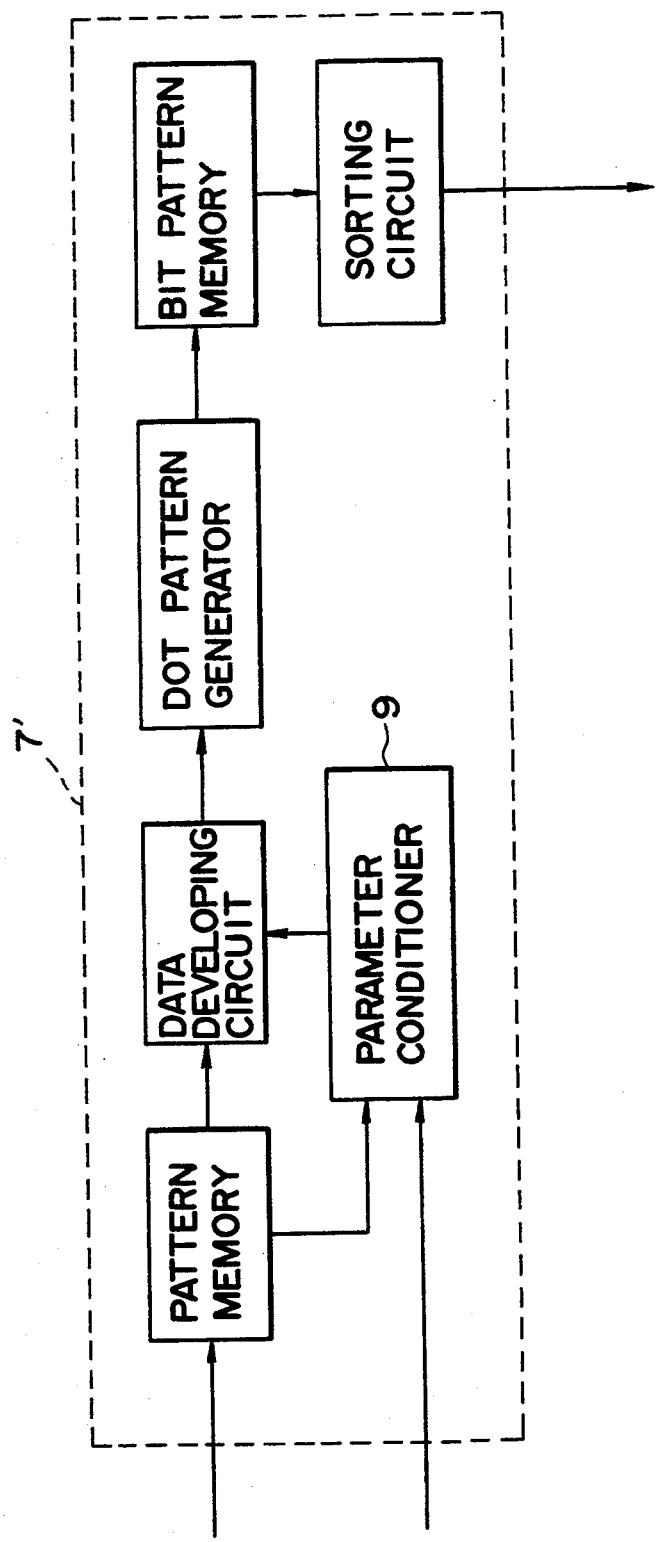
FIG. 9 is a block diagram for another embodiment of the bit pattern generator circuit in FIG. 7.

The bit pattern generator circuit of FIG. 8 is composed of a known bit pattern generator circuit 7 and additional parameter conditioner 9. As shown in FIG. 9, the parameter conditioner 9 may be installed within the bit pattern generator circuit. That is, the bit pattern generator circuit 7' incorporates an additional function of the parameter conditioner 9.

Although in FIG. 8, all the parameters ($\beta$, $\Delta\beta$, K) of the parameter conditioner 9 are controlled by the computer 6, some of the parameters may be controlled by other devices. For instance, scaling K, included in the design pattern data, may be supplied from the pattern memory 71 to the parameter conditioner 9.

Figure 12A:
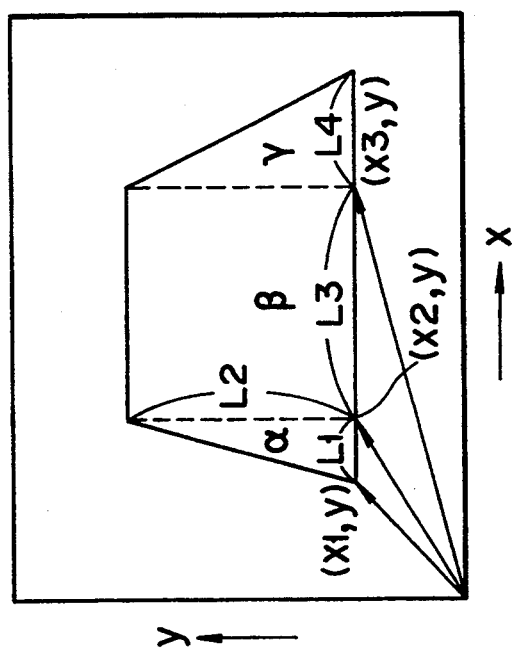
FIGS. 12A and 12B are explanatory diagrams for the action of bit pattern generator according to the present invention.
Figure 12B:
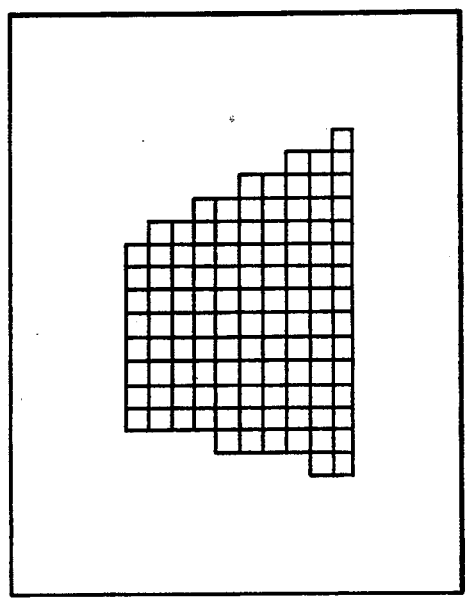

The technique of changing the aforementioned generated bit dimension to the desired value by a combination of the bit pattern generator circuit 7 and the parameter conditioner 9 is particularly important and has great versatility. Thus, the technique will be discussed in further detail. As shown in FIG. 11, vector data 21 is stored in the computer 6 of FIG. 7 or the disk device or memory in the other higher-level computer. Vector data here is defined as a set of simple, basic figure elements such as segments, triangles, and quadrangles, which is obtained by analysis of the shape of a given figure. It also has vector information including the position, the size, and the direction of segment for each figure element. FIG. 12A shows an example of stored vector data 21. The figure (a trapezoid) of FIG. 12A is divided into a right triangle figure element and a quadrangle figure element and then stored. They are expressed by the bit data as shown in FIG. 12B. The figure (the trapezoid) of FIG. 12A is defined as a set of basic figure elements as shown in FIG. 13. Here, the figure elements indicated by $\alpha$, $\beta$, and $\gamma$ combine to form the figure of 12A.

In FIG. 13, the figure elements indicated by $\alpha$ and $\gamma$ are recognized as two different right triangles: $\alpha$ indicates a positive slope right triangle and $\gamma$ represents a negative slope right triangle. The difference shows that each right triangle is in a different position with respect to the x-y coordinates. Each figure element information includes coordinate information. The figure code contained in the figure element information in the vector data 21 is written into the figure code register 26, whereas the (x,y) coordinates and the figure side lengths are written into the registers 22, respectively.

The parameter conditioner 27 converts the coordinates and dimensions specified in the vector data into memory addresses in the bit pattern memory 33, and then writes them into x-coordinate register 28, y-coordinate register 29, and figure-side length registers 30 and 31. In a write operation, the parameter conditioner 27 receives parameters from the higher-level computer to make the precise calculation of address allocation. The parameters here include the magnification of the image-forming system and the inspection mode as described above.

Then, the initial value in the y direction obtained by analyzing the figure code is set to the y-upper end counter 42 and the y-lower end counter 43, each of which is composed of an up-down counter with a preset function.

Figure 15:
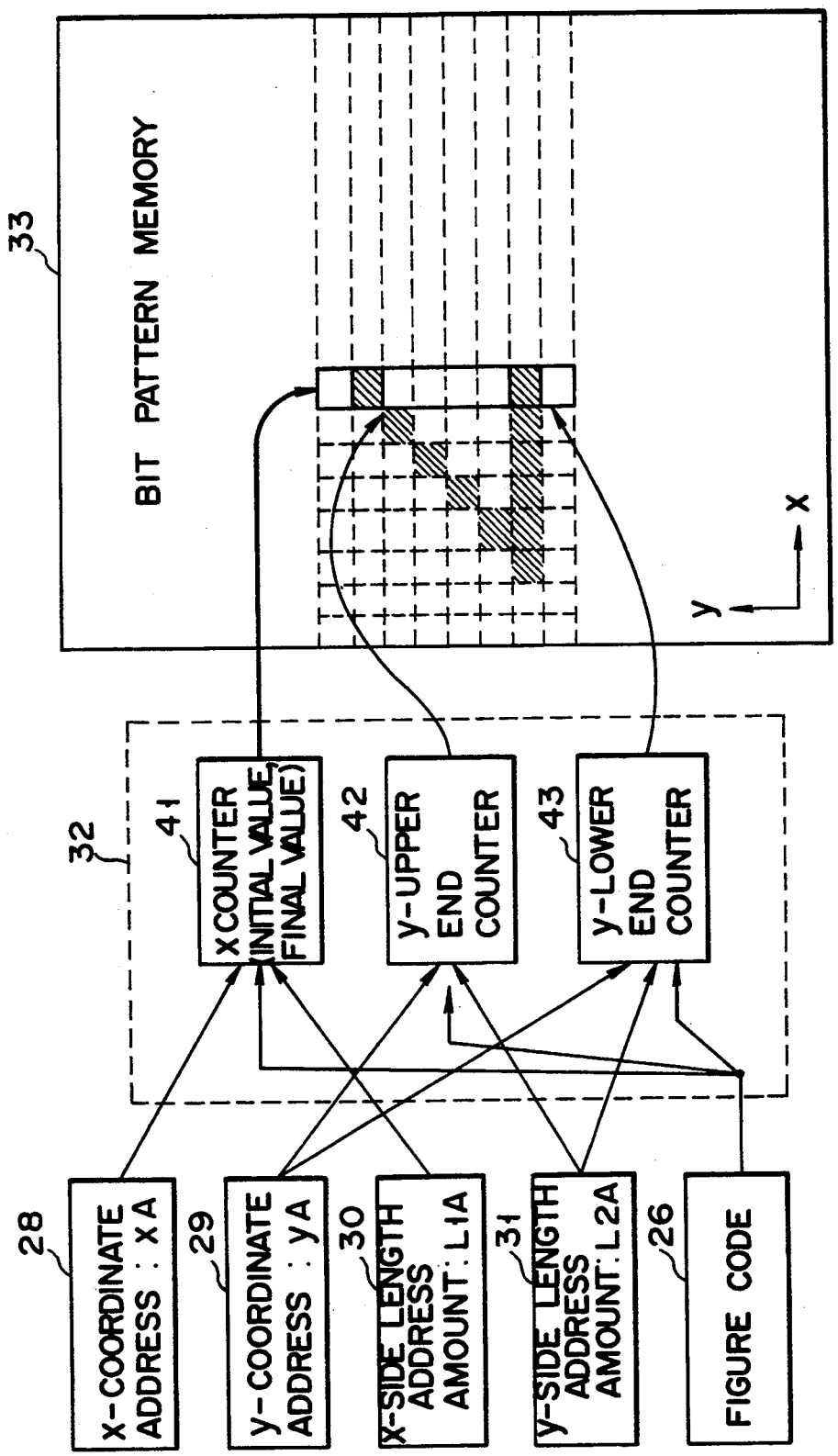
FIG. 15 is a block diagram for a second embodiment of a data generating circuit for generating a bit pattern according to the present invention.

The recording format for basic figures is the same as in FIGS. 13 and 14. In FIG. 15, if the figure code is triangle (1), both the y-upper end counter 42 and the y-lower end counter 43 have y as the initial value. If the figure code is triangle (4), both the y-upper end counter 42 and the y-lower end counter 43 have y+$L_2$ as the initial value. If the figure code is triangle ($\beta$), y+$L_2$ is set to the y-upper end counter 42 and y is set as the initial value to the y-lower end counter 43. The figure element $\alpha$ of FIG. 12A has the figure code of 1, causing both the y- upper end counter 42 and the y-lower end counter 41 to have y as the initial value.

The x counter 41 of FIG. 15 is preset with the contents of the x-coordinate register 28 as the initial value. The length in the x direction of the figure element is $L_1$. The counter 41 counts up starting from the initial value and stops when reaching the initial value +$L_1$. This completes the processing for a single figure element.

In synchronism with the progress of the x counter 41, the bit generating process proceeds while calculating the outline bits for the upper and lower ends of the parallel data in the y direction at the x position. The slope of a triangle is calculated using suitable rules, which are not necessarily special rules and may be any known suitable techniques.

In dividing figure data into basic figure elements, several basic figures can be represented overlapping each other. To cope with this situation, when generated data is written into the bit pattern memory, the data for the address is read out once and then subjected to logical calculation with the data to be written in the read-modify-write process.

In this embodiment, the existence of the bit pattern memory 33 is not essential. Thus, in place of supplying data from the bit pattern memory 33, data may be supplied directly from the computer or memory means. In this case, the parameter conditioner 27 calculates addresses in advance for the registers 28 through 31, not for the bit pattern memory 33.

A second embodiment of a data generating circuit according to the present invention will be explained, referring to FIGS. 17A through 17C. In cases where the position at which a figure element exists cannot be expressed by a form coinciding with a quantization unit (bit) address or where the outline of the figure element passes between quantization units (bits), allocation of a figure element to the bit pattern simply based on round-down calculation creates a figure as shown in FIG. 17C. When the pixel indicated by reference character S in FIG. 17A is observed with the sensor, the black portion is so small that the white portion occupies most of the area. When the observed value is compared with the design reference data, it is judged to be a defect because the reference data is a black pixel. To avoid this problem, correction is made in quantizing a figure element in bits by rounding off fractions less than one bit, as shown in FIG. 17C. This is achieved by the parameter conditioner. In this case, the design reference data corresponding to the observed value is a white pixel, resulting a proper comparison. As with the first embodiment, in writing the obtained bit pattern into the memory, it is necessary to take into account the overlap with the already generated figure.

The following process may be used in place of the above round-off correction. In FIG. 17A, all the bits through which the outline of a figure element passes are divided into subpixels. Specifically, as shown in FIG. 18, a single bit is further divided into subpixels 50 and based on the result of decision by majority regarding the white and black portions of the subpixels, correction of the outline is made appropriately as with rounding off. The process is applied to the pixels indicated by reference character S, for example. The subpixels 50 are 5 by 5, for example.

Figure 19:
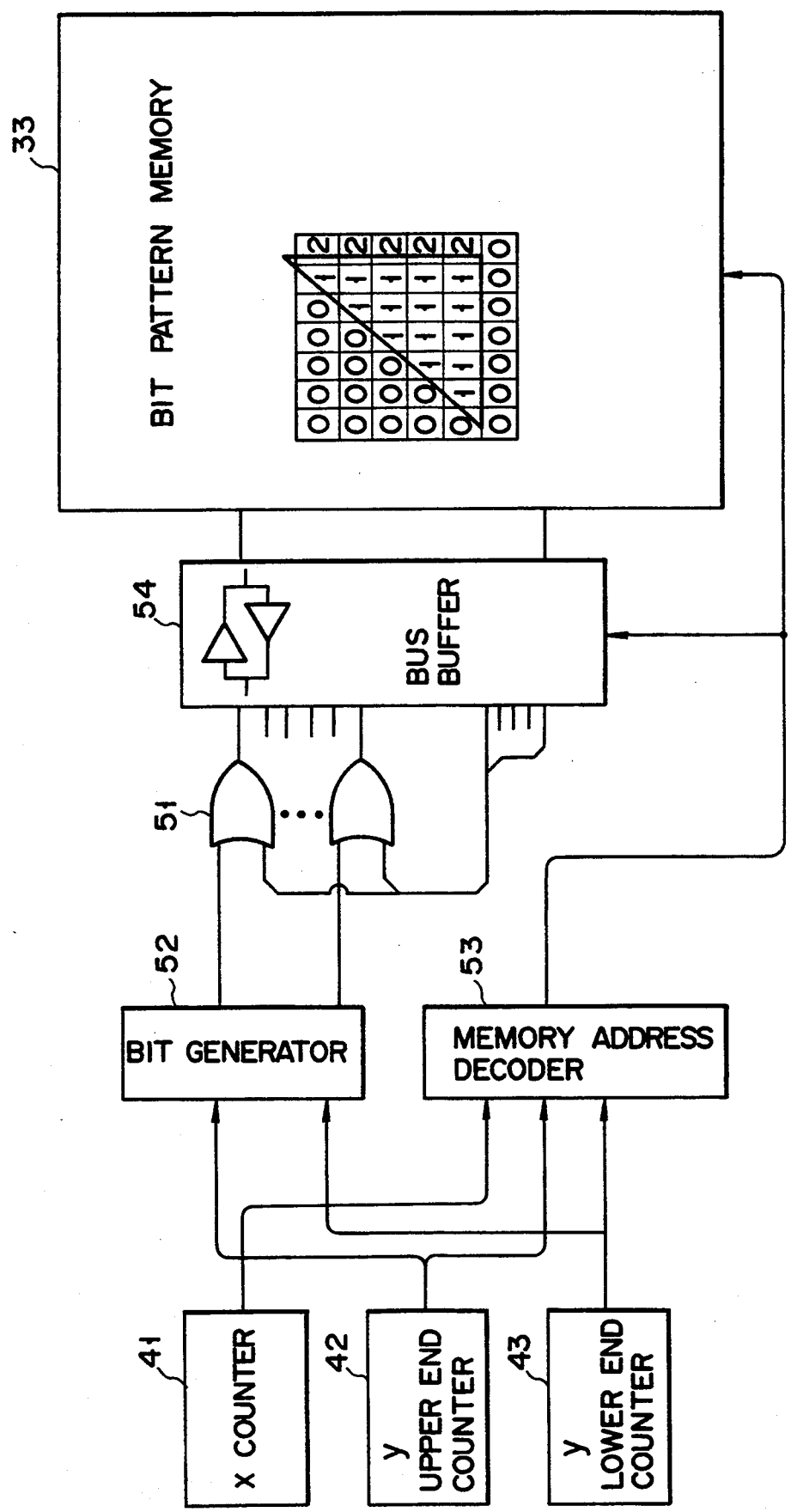
FIG. 19 is a block diagram for a third embodiment of a bit pattern generating circuit according to the present invention.

A third embodiment of a bit pattern generating circuit according to the present invention will be explained. In this embodiment, attention is given to the boundaries between figure elements in dividing a figure into figure elements. When figure elements are connected as a and D in FIG. 12A, the connecting portion can be discarded for each figure elements because each figure element undergoes an independent bit pattern generating process. If it is true, a gap of one bit interposes between two figure elements which are supposed to be connected according to the data. To overcome this problem, a circuit configuration shown in FIG. 19 is used. For the data length of the bit pattern memory 33, two bits are allocated to each array sensor pixel. Although two bits can represent four states, only three states are used here following the conventional manner: the absence of bit is 0, the presence of bit is 1, and a fraction less than a bit rounded down is 2. This causes the figure of FIG. 20A to be represented as shown in FIG. 20B. The second embodiment is different from this embodiment in that the memory data length is one bit and a fraction less than one bit rounded down is expressed as 0. Further, in the second embodiment, the address for the bit pattern memory 33 is obtained on the basis of the values from the x counter 41 and the y counter 42, and then written directly into the address.

In the third embodiment of FIG. 19, before new bit pattern data is written into the bit pattern memory 33, the address to which the data is to be written into is read out. By comparing the read data with the data to be written into, a confirmation is made whether or not a figure is already written. The result of the confirmation is rewritten as the logic circuit 51 performs OR operations. That is, in the previous bit pattern generation, with the data being 1 (the presence of a bit), if 0 or 1 is written into the desired address in the memory 33, the data remains unchanged as 1. On the other hand, in the previous bit pattern generation, if the data at the address in the memory is 0 (the absence of a bit), writing 1 into the address changes the contents to 1. When the data to be written is 2, or when data was rounded down in the previous bit pattern generation, the data 2 to be written into the corresponding address in the memory 33 is treated as normal data 1. FIG. 21 illustrates the relationship between the old and new data. This process eliminates one-bit gaps previously found between basic figure elements. In the second and third embodiments, two-way data transfer between the bit pattern memory 33 and the bit pattern generating circuit 32 is essential. The bit generator circuit 52 and the memory address recorder 53, and the bus buffer 54 are used for the above-mentioned purposes.

While in the first embodiment of the bit pattern generator circuit, the array sensor pixel dimension is matched with the design data bit dimension (quantization dimensions), the present invention is not restricted to this. For instance, design data is divided into pieces, which are then allocated to an integral multiple of bits for a single sensor bit. This technique may be applicable to each component in each embodiment.

The results of bit generation obtained at the bit pattern generator circuit find the following applications: the bit generation results are displayed on the display device; they are printed out for hard copy; they are used in a pattern defect inspection apparatus; and they may be used as a database of design data in a pattern defect inspection apparatus.

A pattern defect inspection apparatus according to another embodiment of the present invention will be explained. In the aforementioned pattern defect inspection apparatus, with the sensor pixel dimension being constant, the design data pixel dimension is matched with the sensor pixel dimension without or with the design data pixel dimension being divided into an integral multiple of pieces.

Methods have been proposed which subdivide the sensor pixel dimension based on the calculation using the output from the sensor pixels to obtain seemingly narrower sensor pixels, and then perform comparison. One of them is disclosed in The Precision Exterior Inspection of LSI Wafer Patters by Local Sliding Pattern Matching Method in The Electronic Information Communications Society Papers D-III Vol. J72-DII No. 12/December, 1989 pp. 2041-2050 by Matsuya ma et al.

Such a method can be used with the method according to the present invention. What is essential here is that the finally compared sensor pixel dimension (subdivided dimension, in this case) coincides with or an integral number of times as large as the pixel dimension obtained from the design data.

Another embodiment of the pattern defect inspection will be explained. Conventionally, there were cases where the rough mode and the precision mode were selectively used for individual substrates being inspected. One reason for a different inspection accuracy is that masks or reticles have different minimum line widths for integrated circuits to be formed. A more basic reason is that each substrate has a different production accuracy. The change between the rough mode and the precision mode is achieved by changing the magnification of the object lens. The object lens, however, involves errors due to the varying magnification, resulting in a problem described in the related art. Since the design data corresponds to each substrate, it is possible to adjust the inspection accuracy for each substrate.

However, it was difficult to change the inspection accuracy while inspecting the same substrate. To change the inspection accuracy, it is necessary either to change the magnification of the object lens or to vary the apparent sensor pixel dimension by interpolation as described in the above literature. Conventionally, there was no means for changing the design data pixel dimension according to the sensor pixel dimension, making it difficult to inspect a substrate while changing the inspection accuracy. As a result, it was a common practice to inspect a single substrate in the same mode.

However, in the present invention that allows the design data bit dimension to be changed to the desired value, for a single substrate, it is possible to make the design data bit dimension more precise for the precision mode inspection or make it rougher for the rough mode inspection. Such changes of the inspection mode and design data bit dimension are accomplished by the change of the projection magnification.

Conventionally, inspecting the entire substrate in the precision mode to increase the inspection accuracy took a long time for inspection even though there were portions to which the rough mode was sufficient. In another case, shortening the inspection time results in poor inspection accuracy. The present invention provides perfect solutions to these problems, assuring the desired inspection accuracy as well as the shorter inspection time.

As described above, a method for allowing use of the rough and precision modes for a single substrate according to the present invention enables the substrate edge portions to be inspected in the rough mode and the internal circuit portions to be inspected in the precision mode. Thus, even elements in which integrated circuit elements of various dimensional accuracy are packed in the same substrate such as ASICs can be inspected with a high accuracy at a high speed.

As explained in detail, according to the present invention, when a figure (pattern) is generated into a bit pattern, the dimension of a single pixel can be set to a given value. Therefore, the application of the present invention to the pattern defect inspection ensures the elimination of spurious defects and a great improvement in the inspection accuracy.

By correcting fractions less than a pixel resulted from the generation of a figure (pattern) into a bit pattern under specified conditions, the figure can be generated into a bit pattern that most closely reflects the original figure (pattern). Therefore, the application of the present invention to the pattern defect inspection ensures the elimination of spurious defects and a great improvement in the inspection accuracy.

When at least two figures are connected in generating a figure (pattern) into a bit pattern, the rounding down of the fractions at the boundary portions of the at least two figures can be prevented. Therefore, the application of the present invention to the pattern defect inspection ensures the elimination of spurious defects and a great improvement in the inspection accuracy.

Further, the present invention allows the change of inspection accuracy for a single substrate, ensuring the elimination of spurious defects and a great improvement in the inspection accuracy.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A system for checking a defect in a figure pattern which is formed on a photomask used for manufacturing a semiconductor integrated circuit element, said figure pattern being defined by predetermined parameters and having predetermined bit dimensions, said system comprising:

memory means for storing design data which indicates a figure pattern defined by predetermined parameters and having predetermined bit dimensions;

a table on which the photomask is placed;

a driving mechanism for moving the table in X- and Y-directions;

control means for controlling the driving mechanism;

a light source for emitting light to the photomask;

an optical system for optically processing light which has been transmitted through the photomask;

photodetector means for detecting light output from the optical system so as to obtain bit patterns representing the figure pattern formed on the photomask;

conditioning means for conditioning parameters of the design data on the basis of a predetermined inspection magnification $\beta$, a magnification difference $\Delta\beta$ between the figure pattern indicated by the design data and the figure pattern formed on the photomask, and a scaling factor K;

developing means for developing the design data into elemental figure data on the basis of the parameters conditioned by the conditioning means;

a bit pattern generator for generating bit patterns which define the elemental figure data, on the basis of the elemental figure data obtained by the developing means;

comparison means for comparing, in units of one bit, the bit patterns generated by the generating means and the bit patterns obtained by the photodetector means;

determination means for determining whether or not the figure pattern formed on the photomask is defective on the basis of comparison results obtained by the comparison means; and output means for outputting data representing the presence of a defective bit pattern when the determination means determines that the figure pattern on the photomask is defective.

2. A system for checking a defect in a figure pattern which is formed on a photomask used for manufacturing a semiconductor integrated circuit element, said figure pattern being defined by predetermined parameters and having predetermined bit dimensions, said system comprising:

memory means for storing design data which indicates a figure pattern defined by predetermined parameters and having predetermined bit dimensions;

a table on which the photomask is placed;

a driving mechanism for moving the table in X- and Y-directions;

control means for controlling the driving mechanism;

a light source for emitting light to the photomask;

an optical system for optically processing light which has been transmitted through the photomask;

photodetector means for detecting light output from the optical system so as to obtain bit patterns representing the figure pattern formed on the photomask;

quantization means for quantizing elemental figures which are represented by the design data read out from the memory means;

conversion means for converting bit dimensions of the element figures quantized by the quantizing means into bit dimensions which coincide with bit dimensions of the figure pattern represented by the light detected by the photodetector means;

developing means for developing the elemental figures quantized by the quantization means into bit patterns;

comparison means for comparing, in units of one bit, the bit patterns obtained by the developing means and the bit patterns obtained by the photodetector means;

determination means for determining whether or not the figure pattern formed on the photomask is defective on the basis of comparison results obtained by the comparison means; and output means for outputting data representing the presence of a defective bit pattern when the determination means determines that the figure pattern on the photomask is defective.

3. The system according to claim 2, wherein said conversion means includes means for varying a magnification of the bit dimensions of the elemental figures such that the bit dimensions of the element figures quantized by the quantizing means coincide with the bit dimensions of the figure pattern represented by the light detected by the photodetector means.

4. The system according to claim 2, wherein said conversion means includes means for allocating a fraction, which is data on less than one pixel and is produced when the elemental figures are quantized by the quantizing means, to predetermined bit pattern data on the basis of at least one of rounding-up, rounding-down and rounding-off results obtained with respect to the fraction.

5. The system according to claim 2, wherein said conversion means includes means for dividing the elemental figures quantized by the quantizing means into a plurality of elemental figures which are connected to one another by means of boundary segments.

* * * * *